(12) United States Patent
Krenz

(10) Patent No.: US 11,953,921 B2
(45) Date of Patent: Apr. 9, 2024

(54) VEHICULAR SYSTEM AND METHOD FOR PRE-ARMING ACTIONS ACCORDING TO CONDITIONAL TIMELINE AND ASSOCIATED TRIGGER EVENTS

(71) Applicant: Rockwell Collins, Inc., Cedar Rapids, IA (US)

(72) Inventor: Michael J. Krenz, Roscoe, IL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 370 days.

(21) Appl. No.: 17/345,171

(22) Filed: Jun. 11, 2021

(65) Prior Publication Data

US 2022/0397918 A1 Dec. 15, 2022

(51) Int. Cl.
| | |
|---|---|
| *G06F 3/0482* | (2013.01) |
| *B64D 43/00* | (2006.01) |
| *B64D 45/00* | (2006.01) |
| *G05D 1/00* | (2006.01) |
| *G06F 3/0484* | (2022.01) |
| *G08G 5/00* | (2006.01) |

(52) U.S. Cl.
CPC ............. *G05D 1/106* (2019.05); *B64D 43/00* (2013.01); *B64D 45/00* (2013.01); *G06F 3/0482* (2013.01); *G06F 3/0484* (2013.01); *G08G 5/003* (2013.01); *B64D 2045/0075* (2013.01)

(58) Field of Classification Search
CPC ........................ G08G 5/003; G06F 3/048–05
See application file for complete search history.

(56) References Cited

U.S. PATENT DOCUMENTS

| | | |
|---|---|---|
| 5,012,409 A | 4/1991 | Fletcher et al. |
| 6,542,796 B1 | 4/2003 | Gibbs et al. |
| 6,907,416 B2 | 6/2005 | Tasooji et al. |
| 6,946,976 B1 | 9/2005 | Langner et al. |
| 7,787,999 B1 | 8/2010 | Barber |
| 8,260,736 B1 | 9/2012 | Lear et al. |
| 8,467,966 B2 | 6/2013 | Barnetche et al. |
| 8,694,184 B1 | 4/2014 | Boorman et al. |
| 9,043,051 B1 | 5/2015 | Barber |
| 9,846,523 B2 | 12/2017 | Kawalkar et al. |
| 10,746,560 B2* | 8/2020 | Luchner ............. G01C 21/3676 |
| 2008/0103641 A1 | 5/2008 | Ratcliffe |
| 2009/0062972 A1 | 3/2009 | Boorman et al. |

(Continued)

FOREIGN PATENT DOCUMENTS

| | | |
|---|---|---|
| EP | 3578462 A1 | 12/2019 |
| EP | 3660461 A1 | 6/2020 |

(Continued)

OTHER PUBLICATIONS

English Translation of WO 2019140695 A1, published on Jul. 25, 2019 (Year: 2019).*

(Continued)

*Primary Examiner* — Daniel Rodriguez
(74) *Attorney, Agent, or Firm* — Suiter Swantz pc llo

(57) ABSTRACT

A system may include a user interface and a processor. The processor may be configured to (a) pre-arm multiple actions according to a conditional timeline and any associated trigger events, and (b) output commands to cause the multiple actions to be completed at times consistent with the conditional timeline and any associated trigger events.

20 Claims, 12 Drawing Sheets

(56) References Cited

U.S. PATENT DOCUMENTS

| | | | |
|---|---|---|---|
| 2010/0106346 A1 | 4/2010 | Badli et al. | |
| 2010/0332054 A1 | 12/2010 | Brandao et al. | |
| 2012/0278388 A1* | 11/2012 | Kleinbart | G06Q 10/06 709/204 |
| 2014/0156114 A1* | 6/2014 | Aymeric | G01C 23/00 701/3 |
| 2014/0156115 A1* | 6/2014 | Aymeric | G08G 5/0052 701/3 |
| 2017/0158345 A1* | 6/2017 | Saez | G01C 23/00 |
| 2019/0227558 A1* | 7/2019 | Lampazzi | G01C 23/00 |
| 2020/0134940 A1* | 4/2020 | Gowda | G06F 3/04847 |
| 2020/0160253 A1 | 5/2020 | Johnson et al. | |
| 2020/0168104 A1* | 5/2020 | Holder | G08G 5/0039 |
| 2020/0380443 A1* | 12/2020 | Holder | G06N 20/00 |
| 2021/0146948 A1* | 5/2021 | Lim | G07C 5/0816 |
| 2022/0055216 A1* | 2/2022 | Kang | B25J 9/1661 |

FOREIGN PATENT DOCUMENTS

| | | | |
|---|---|---|---|
| GB | 2488916 B | 2/2014 | |
| WO | WO-2019140695 A1 * | 7/2019 | H04W 4/02 |

OTHER PUBLICATIONS

Garmin, StreetPilot 2610/2650 portable car navigation operating instructions, Jul. 2003, p. 17.

Extended European Search Report in European Application No. 22178204.8 dated Nov. 17, 2022, 4 pages.

\* cited by examiner

VEHICULAR SYSTEM AND METHOD FOR PRE-ARMING ACTIONS ACCORDING TO CONDITIONAL TIMELINE AND ASSOCIATED TRIGGER EVENTS

CROSS-REFERENCE TO RELATED APPLICATIONS

The present application is related to U.S. application Ser. No. 13/743,614, titled Event-Based Flight Management System, Device, and Method, filed Jan. 17, 2013, issued as U.S. Pat. No. 9,043,051 on May 26, 2015, which is herein incorporated by reference in its entirety.

BACKGROUND

In many human-in-the-loop control systems, there is a prescribed sequence of events where the human is expected to take an action, wait for a criterion to be met, then take another action, wait for a feedback criterion to be met, take another action, etc. This can lead to issues as humans are not in general very patient, humans will assume outcomes, forget criteria, lose their place in the sequence, miss steps in the sequence, etc. This problem can be made even worse when user interface systems that are poor at communicating feedback or are difficult to actuate accurately, such as requiring accurate repositioning of a hand between widely time spaced steps (e.g., on a touchscreen display). For example, touch screen controls are often difficult to operate with respect to lists of events that require very accurate, intermittent, sequential hand inputs. Additionally, for example, such problems can dramatically diminish a user's situational awareness, which is important for operating vehicles, such as aircraft. Additionally, for example, navigating such user interface systems to complete actions often represents a significant portion of a user's workload for operating vehicles, such as aircraft.

SUMMARY

In one aspect, embodiments of the inventive concepts disclosed herein are directed to a system. The system may include a user interface configured to receive user inputs of at least one user. The system may further include at least one processor. One or more of the at least one processor may be installed in a vehicle. The at least one processor may be communicatively coupled to the user interface. The at least one processor may be configured to: receive a sequence of user inputs from the user interface as instructions to pre-arm multiple actions to be completed according to a conditional timeline, wherein some or all of the multiple actions are to be completed non-simultaneously from at least one other of the multiple actions, wherein some or all of the multiple actions have at least one trigger event that conditionally occurs along the conditional timeline; pre-arm each of the multiple actions to be completed according to the conditional timeline and any associated trigger events; for any action of the multiple actions having at least one associated trigger event, monitor the at least one associated trigger event, wherein when all of the at least one trigger event are present for a given action, the at least one trigger event triggers an associated command causing the given action to be completed; and output commands, wherein each of the commands is a command to cause one of the multiple actions to be completed at a time consistent with the conditional timeline and any associated trigger events.

In a further aspect, embodiments of the inventive concepts disclosed herein are directed to a method. The method may include steps of: receiving, by at least one processor, a sequence of user inputs from at least one user interface as instructions to pre-arm multiple actions to be completed according to a conditional timeline, wherein some or all of the multiple actions are to be completed non-simultaneously from at least one other of the multiple actions, wherein some or all of the multiple actions have at least one trigger event that conditionally occurs along the conditional timeline, wherein one or more of the at least one processor is installed in a vehicle, wherein the at least one processor is communicatively coupled to the user interface; pre-arming, by the at least one processor, each of the multiple actions to be completed according to the conditional timeline and any associated trigger events; for any action of the multiple actions having at least one associated trigger event, monitoring, by the at least one processor, the at least one associated trigger event, wherein when all of the at least one trigger event are present for a given action, the at least one trigger event triggers an associated command causing the given action to be completed; and outputting, by the at least one processor, commands, wherein each of the commands is a command to cause one of the multiple actions to be completed at a time consistent with the conditional timeline and any associated trigger events.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
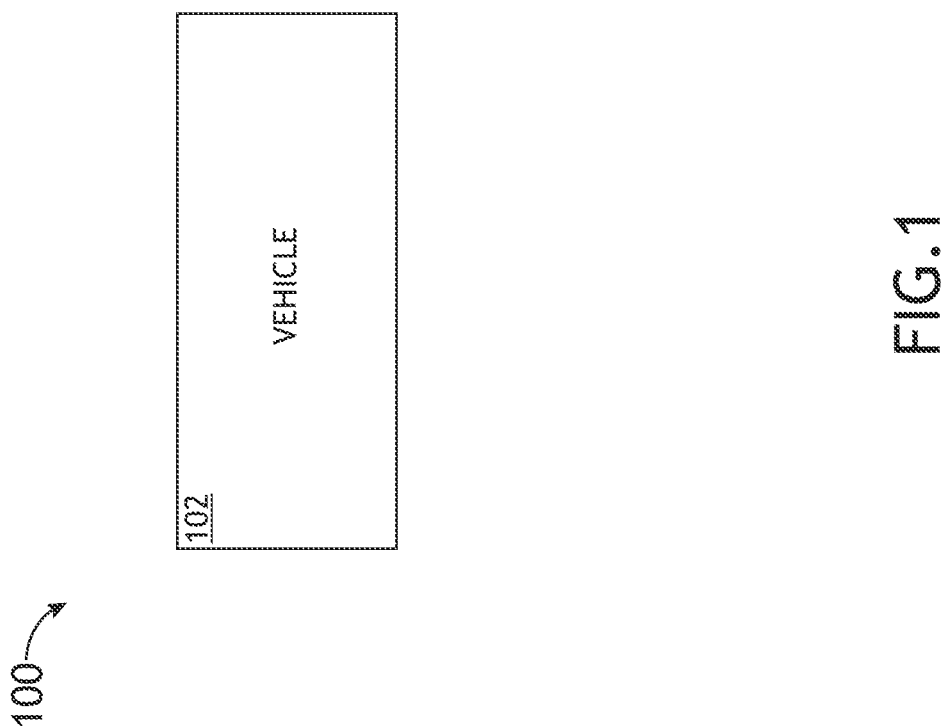
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a method and a system including a user interface and at least one processor configured to (a) pre-arm multiple actions according to a conditional timeline and any associated trigger events, and (b) output commands to cause the multiple actions to be completed at times consistent with the conditional timeline and any associated trigger events. In some embodiments, the system may include a vehicle (e.g., an aircraft); however, in other embodiments, the system may be a non-vehicular system lacking a vehicle.

In some embodiments, by allowing a user to arm multiple actions in a sequence at any time, the user can complete their thought pattern with one uninterrupted thought sequence and then check back later for status. For example, the user can pre-program or pre-set items to occur conditionally or at a given point in time to help balance out the user's work load. For example, some embodiments can be beneficial to a user when the user is operating an aircraft, such as a user performing reduced crew or single pilot operations.

Some embodiments allow a user to pre-arm an action(s) in advance of when the action will be completed, and when the system senses a prerequisite trigger event is satisfied for the action, the action system outputs a command to start and/or complete the action. Action items may be graphical depictions associated with actions, where each action is executed upon a particular trigger event(s) being satisfied. Flight plan information, aircraft information, and/or other actions can serve as trigger event(s) for a given action.

For example, the advantages of pre-arming an action and then later conditionally auto-executing the action may include the user only needing to visit a user interface once instead of intermittently over a period of time, letting a processor monitor and evaluate progression of any associated trigger events may be more accurate than humans, and may lessen a likelihood of incomplete tasks due to distraction, etc.

In some embodiments, the user may interrupt or cancel pre-armed actions if a situation changes. In some embodiments, the system may also provide an alert to the user in a timely manner if a pre-armed action does not complete for whatever reason(s). In some embodiments, the system may provide an alert to the user that a trigger event has been satisfied, wherein the alert may require user acknowledgement and/or approval prior to execution of the pre-armed action; such acknowledgement and/or approval may increase the user's situational awareness of pre-armed actions that are occurring and/or about to occur.

Figure 2:
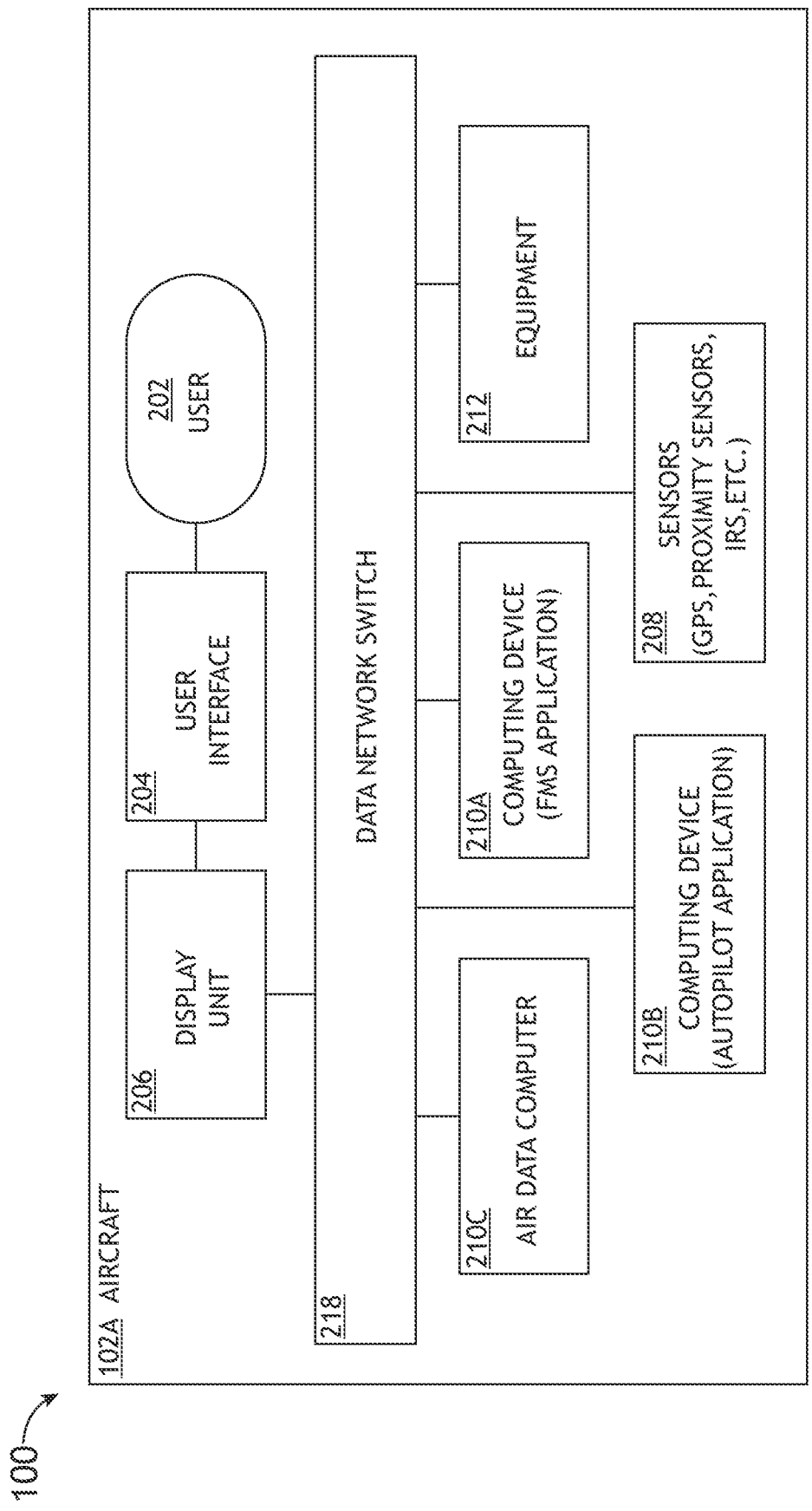
FIG. 2 is a view of an exemplary embodiment of the vehicle of FIG. 1 as an aircraft according to the inventive concepts disclosed herein.

Referring now to FIGS. 1, 2, 3, 4, and 5, an exemplary embodiment of a system 100 according to the inventive concepts disclosed herein is depicted. As shown in FIG. 1, in some embodiments, the system 100 may include at least one vehicle 102 (e.g., at least one aircraft 102A as shown in FIG. 2), off-board computing device(s) (not shown, but similar to computing device 210), off-board user interface (not shown, but similar to user interface 204), and/or at least one ground control station (not shown) (e.g., ATC (not shown)), some or all of which may be communicatively coupled at any given time. In some embodiments, the system 100 is a non-vehicular system that lacks the vehicle 102; in such embodiments, some or all of the components and associated functions of the vehicle 102 (e.g., 102A) may be implemented without a vehicle.

For example, as shown in FIGS. 2, 3, 4, and 5, an aircraft 102 may include at least one user 202, at least one user interface 204, at least one display unit computing device 206, sensors 208, at least one computing device 210A, at least one computing device 210B, at least one computing device 210C, equipment 212, and/or a data network switch 218, some or all of which may be communicatively coupled at any given time, such as via the data network switch 218. In some embodiments, the user interface 204, the at least one display unit computing device 206, the at least one computing device 210A, the at least one computing device 210B, and/or the at least one computing device 210C may be implemented as a single computing device or any number of computing devices configured to perform any or all of the operations disclosed throughout. In some embodiments, some or all of the at least one user 202, the at least one user interface 204, the at least one display unit computing device 206, the at least one computing device 210A, the at least one computing device 210B, and/or the at least one computing device 210C may be implemented onboard the aircraft 102. In some embodiments, the at least one user 202 (e.g., a remote pilot or remote crewmember), the at least one user interface 204, the at least one display unit computing device 206, the at least one computing device 210A, the at least one computing device 210B, and/or the at least one computing device 210C may be implemented offboard of the aircraft 102, for example, if a given aircraft 102 is a remote piloted aircraft (e.g., an unmanned aerial vehicle (UAV) or a drone aircraft).

The user 202 may be a pilot, a remote pilot, a crew member, or a remote crew member. The user 202 may be configured to interface with the system via the user interface 204, for example, to: pre-arm, acknowledge, approve, interrupt, and/or cancel actions; view and/or interact with action items associated with the actions; view and/or set any associated trigger events relating to the actions; view and/or interact with statuses of actions and/or trigger events; receive alerts; view and/or interact with graphical depictions (e.g., which may include a conditional timeline (e.g., a conditional timeline that functions as a flight control panel, a conditional timeline that functions as an interactive electronic flight checklist, a flight plan relative conditional timeline, or a flight plan relative and aircraft information relative conditional timeline) and multiple action items); and/or perform flight, pre-flight, and/or post-flight operations. The at least one user interface 204 may be implemented as any suitable user interface, such as a touchscreen (e.g., of the display unit computing device 206 and/or another display unit), a multipurpose control panel, a cursor control panel, a keyboard, a mouse, a trackpad, a button, a switch, an eye tracking system, and/or a voice recognition system. The user interface 204 may be configured to receive user inputs (e.g., a user selection) and to output the user inputs (e.g., the user selection) to a computing device (e.g., the display unit computing device 206 and/or the computing device 210A, 210B, and/or 210C).

Figure 3:
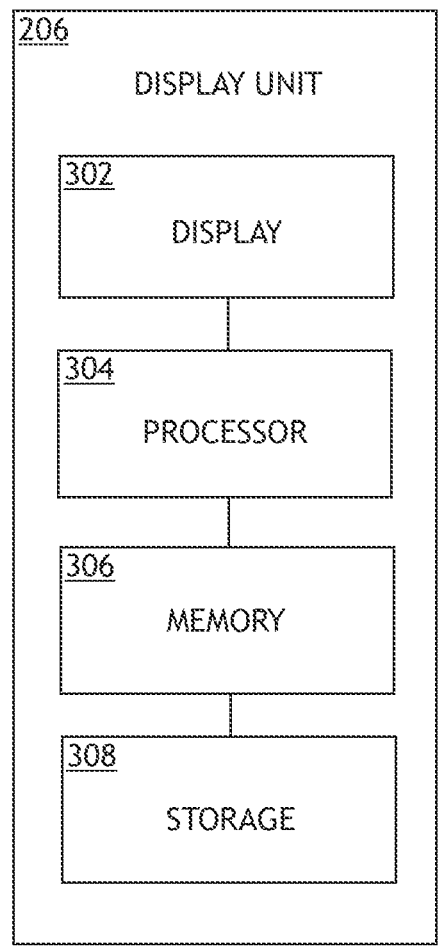
FIG. 3 is a view of an exemplary embodiment of the display unit computing device of FIG. 2 according to the inventive concepts disclosed herein.

The display unit computing device 206 may be implemented as any suitable computing device, such as a multi-function window (MFW) computing device, which may display views of maps and/or flight plans, among other suitable things. As shown in FIG. 3, the display unit computing device 206 may include at least one display 302, at least one processor 304, at least one memory 306, and/or storage 308, some or all of which may be communicatively coupled at any given time. For example, the at least one processor 304 may include at least one general purpose processor (e.g., at least one central processing unit (CPU)), at least one digital signal processor (DSP), at least one application specific integrated circuit (ASIC), and/or at least one field-programmable gate array (FPGA). The processor 304 may be configured to run various software applications (e.g., a map window application) or computer code stored (e.g., maintained) in a non-transitory computer-readable medium (e.g., memory 306 and/or storage 308) and configured to execute various instructions or operations. The processor 304 may be configured to perform any or all of the operations disclosed throughout. For example, the processor 304 may be configured to: receive sensor data from the sensors 208; receive and/or output data from and/or to at least one other computing device (e.g., 210A, 210B, and/or 210C); receive and/or output data from and/or to the equipment 212; execute the map window application; receive data and views of maps; receive user inputs from the user interface 204; receive image data associated with graphical depictions (e.g., from the computing device 210A); and/or output the image data to the display 302. The display 302 may be configured to: present the graphical depictions to the user 202.

The sensors 208 may be any suitable sensors configured to output sensor data to another computing device (e.g., 206, 210A, 210B, and/or 210C). For example, the sensors 208 may include any or all of the following: at least one global positioning system (GPS) sensor; at least one inertial reference system (IRS) sensor; at least one throttle position sensor; at least one aircraft position sensor; at least one altimeter; at least one groundspeed sensor; at least one proximity sensor; at least one landing gear sensor; at least one flap sensor; at least one engine sensor; at least hydraulic system sensor; at least one pneumatic system sensor (e.g., at least one pressurization sensor and/or at least one environmental control system (ECS) sensor) and/or any other sensors commonly installed in aircraft. The sensors 208 may be configured to output sensor data (e.g., aircraft three-dimensional (3D) position and/or speed) to some or all of the computing devices (e.g., 206, 210A, 210B, and/or 210C) and/or the communications and/or surveillance equipment 516.

Figure 4:
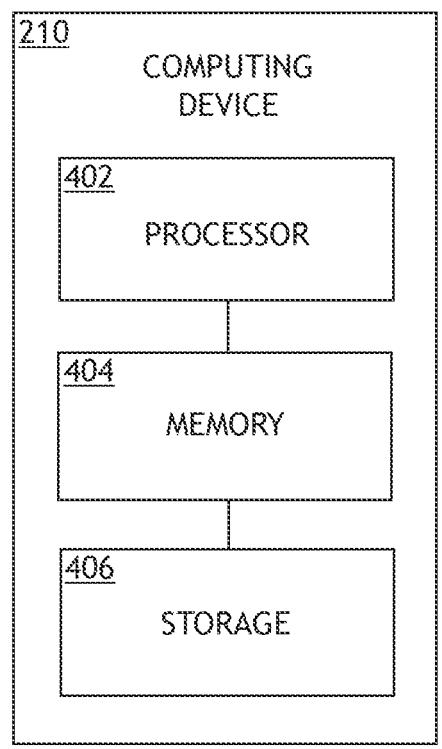
FIG. 4 is a view of an exemplary embodiment of a computing device of FIG. 2 according to the inventive concepts disclosed herein.

The computing device 210A may be implemented as any suitable computing device, such as a flight management system (FMS) computing device and/or a flight data computer. As shown in FIG. 4, the computing device 210A may include the elements of the computing device 210 and may include at least one processor 402, at least one memory 404, and/or at least one storage 406, some or all of which may be communicatively coupled at any given time. For example, the at least one processor 402 may include at least one general purpose processor (e.g., at least one central processing unit (CPU)), at least one digital signal processor (DSP), at least one application specific integrated circuit (ASIC), and/or at least one field-programmable gate array (FPGA). The processor 402 may be configured to run various software applications (e.g., an FMS application) or computer code stored (e.g., maintained) in a non-transitory computer-readable medium (e.g., memory 404 and/or storage 406) and configured to execute various instructions or operations. The processor 402 of the computing device 210A may be configured to perform any or all of the operations disclosed throughout.

For example, the processor 402 of the computing device 210A may be configured to: receive sensor data from the sensors 208; receive and/or output data from and/or to at least one other computing device (e.g., 206, 210B, and/or 210C); receive and/or output data from and/or to the equipment 212; receive a sequence of user inputs from the user interface as instructions to pre-arm multiple actions to be completed according to a conditional timeline, wherein some or all of the multiple actions are to be completed non-simultaneously from at least one other of the multiple actions, wherein some or all of the multiple actions have at least one trigger event that conditionally occurs along the conditional timeline; pre-arm each of the multiple actions to be completed according to the conditional timeline and any associated trigger events; for any action of the multiple actions having at least one associated trigger event, monitor the at least one associated trigger event, wherein when all of the at least one trigger event are present for a given action, the at least one trigger event triggers an associated command causing the given action to be completed; output commands, wherein each of the commands is a command to cause one of the multiple actions to be completed at a time consistent with the conditional timeline and any associated trigger events; and/or output image data associated with a graphical depiction including the conditional timeline and multiple action items for presentation to the at least one user, each action item indicating a particular action of the multiple actions and a status of the particular action. For example, each status may include an indication that the particular action is at least one of complete, awaiting completion of all associated trigger events, incomplete, failed, armed, deferred, or on standby. In some embodiments, the multiple action items may be graphically arranged along the conditional timeline according to a relative order of when the multiple actions associated with the multiple action items would at least one of begin or be completed.

In some embodiments, the multiple action items are graphically arranged along the conditional timeline according to a relative order of when the multiple actions associated with the multiple action items would at least one of begin or be completed.

In some embodiments, the processor 402 of the computing device 210A may be further configured to receive at least one additional user input as an instruction to add at least one additional action to the multiple actions. For example, the at least one additional action may be conditional on beginning or completing at least one other of the multiple actions. For example, the graphical depiction may further include a collection (e.g., a parking lot) of possible additional action items, wherein the at least one additional action may be associated with at least one of the collection of possible action items, wherein the at least one of the collection of possible action items may be selected from the collection by one or more of the at least one user. For example, the at least one additional action may be multiple additional actions, wherein the multiple additional actions may be associated with a template of multiple additional action items, wherein the template may be selected by one or more of the at least one user, for example, to add such action items to the conditional timeline.

In some embodiments, a trigger event for a given action may be any conditional event that may or will occur before the given action is started and/or completed. For example, a trigger event for the given action may be based on: a specified clock time; a specified time relative to a flight plan item (e.g., two minutes before top-of-descent (ToD)); a specified time to or from a location or aircraft; a duration; a specified distance to or from a location (e.g., a waypoint) or aircraft; a specified location (e.g., a waypoint); flight plan information; aircraft information (e.g., aircraft state information); and/or starting, completing, receiving approval and/or acknowledgement for, deferring, failing, interrupting, pausing, and/or cancelling another action (e.g., a preceding action) and/or a sequence of other actions.

Figure 6:
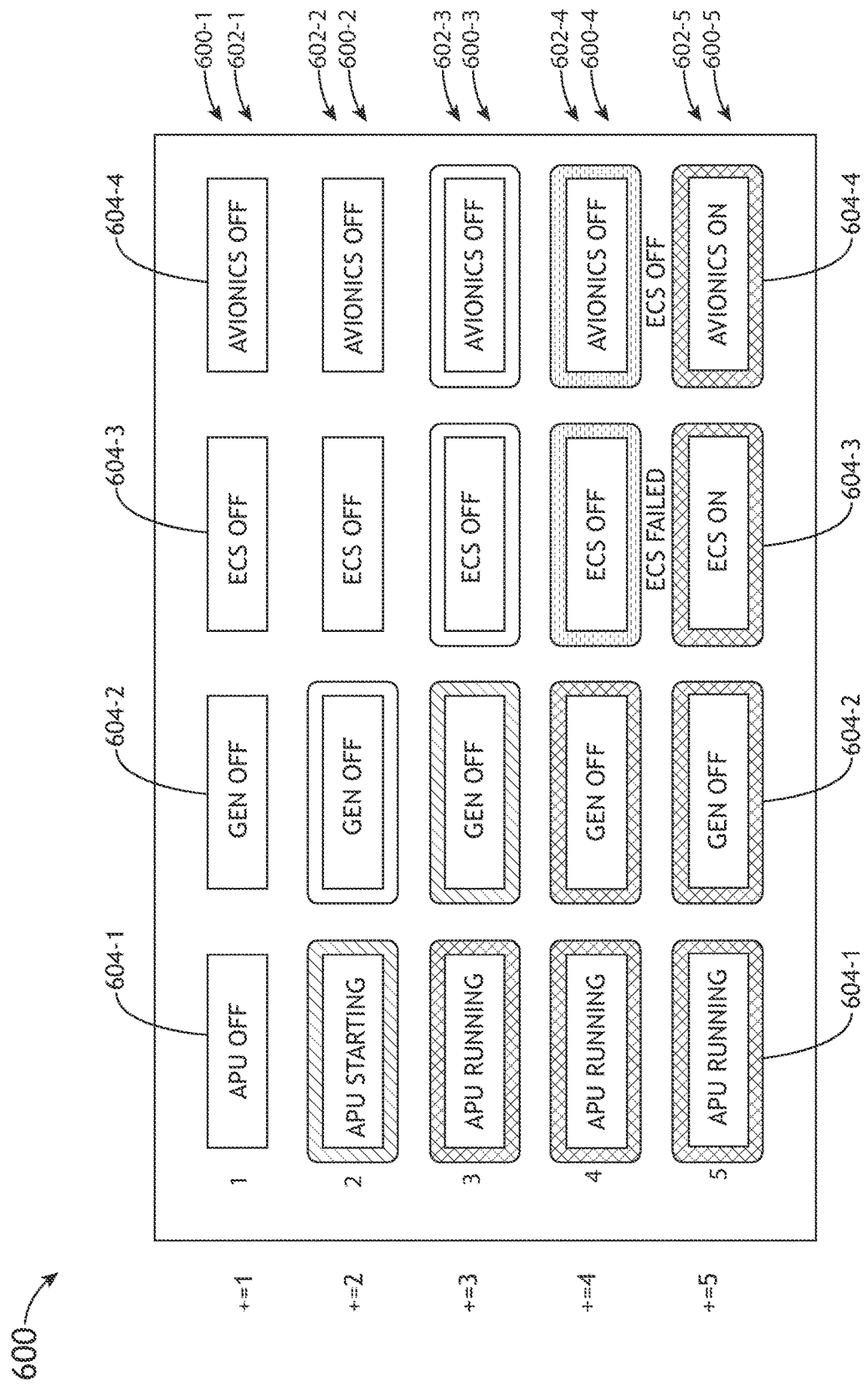
FIG. 6 is a view of an exemplary embodiment of a graphical depiction according to the inventive concepts disclosed herein.

In some embodiments, the graphical depiction (e.g., 600-1 through 600-4 as shown in FIG. 6) of the conditional timeline and the multiple action items may function as a graphical flight control panel.

Figure 11:
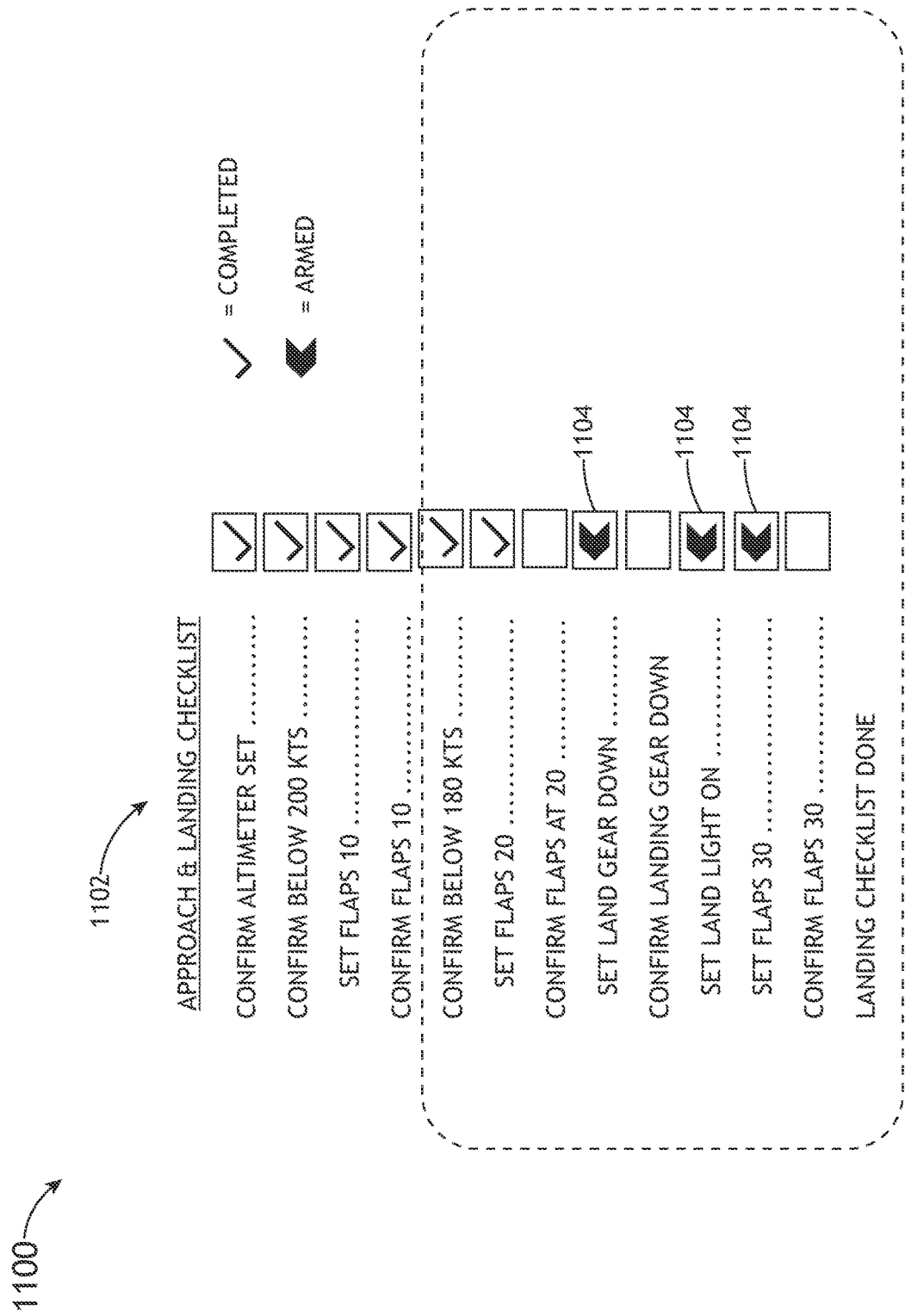
FIG. 11 is a view of an exemplary embodiment of a graphical depiction according to the inventive concepts disclosed herein.

In some embodiments, the graphical depiction (e.g., 1100 as shown in FIG. 11) of the conditional timeline and the multiple action items may function as an interactive electronic flight checklist, wherein each of the multiple action items is an electronic flight checklist item, wherein each of the multiple actions is associated with one of the electronic flight checklist items.

Figure 7:
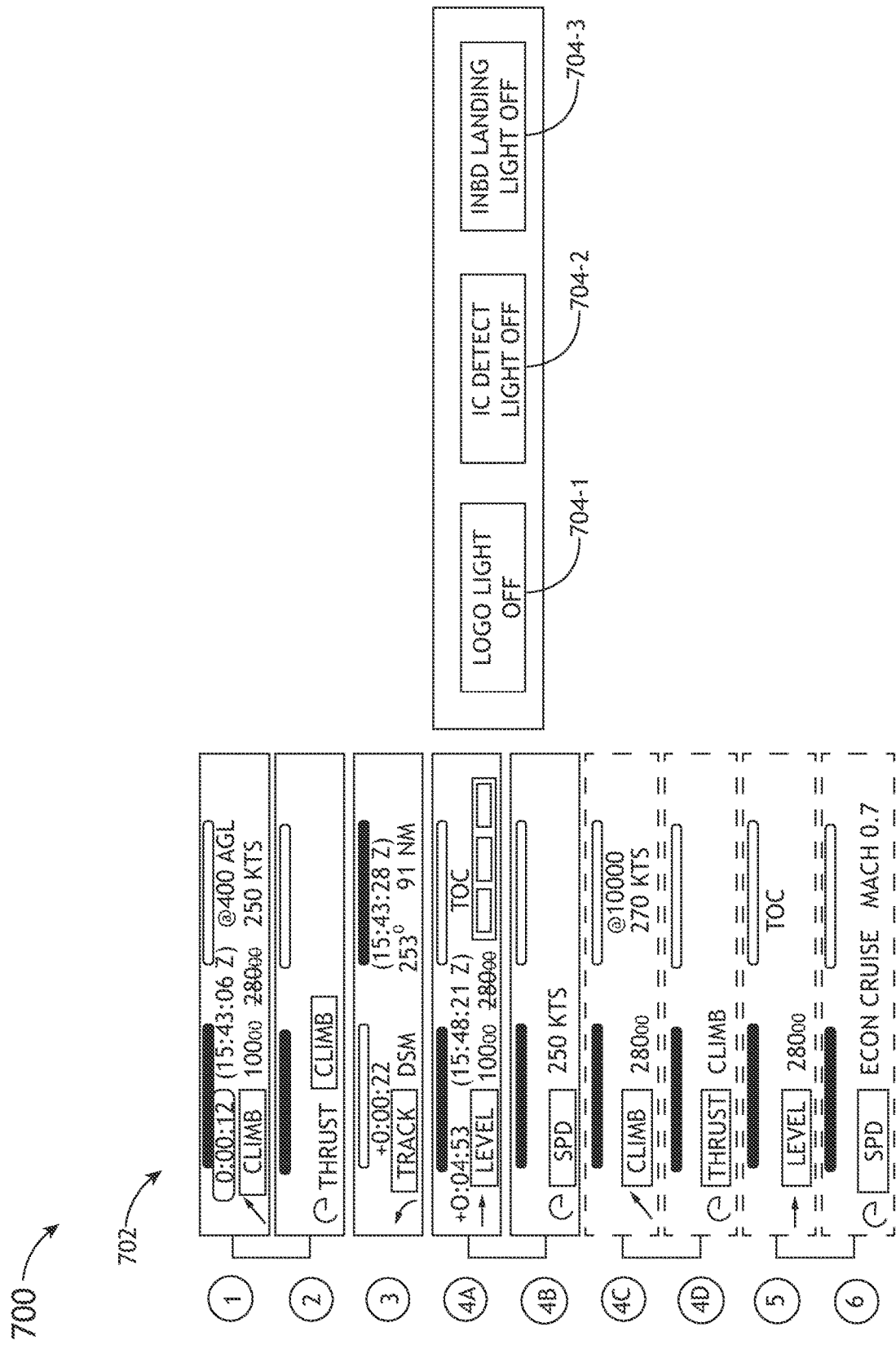
FIG. 7 is a view of an exemplary embodiment of a graphical depiction according to the inventive concepts disclosed herein.
Figure 8:
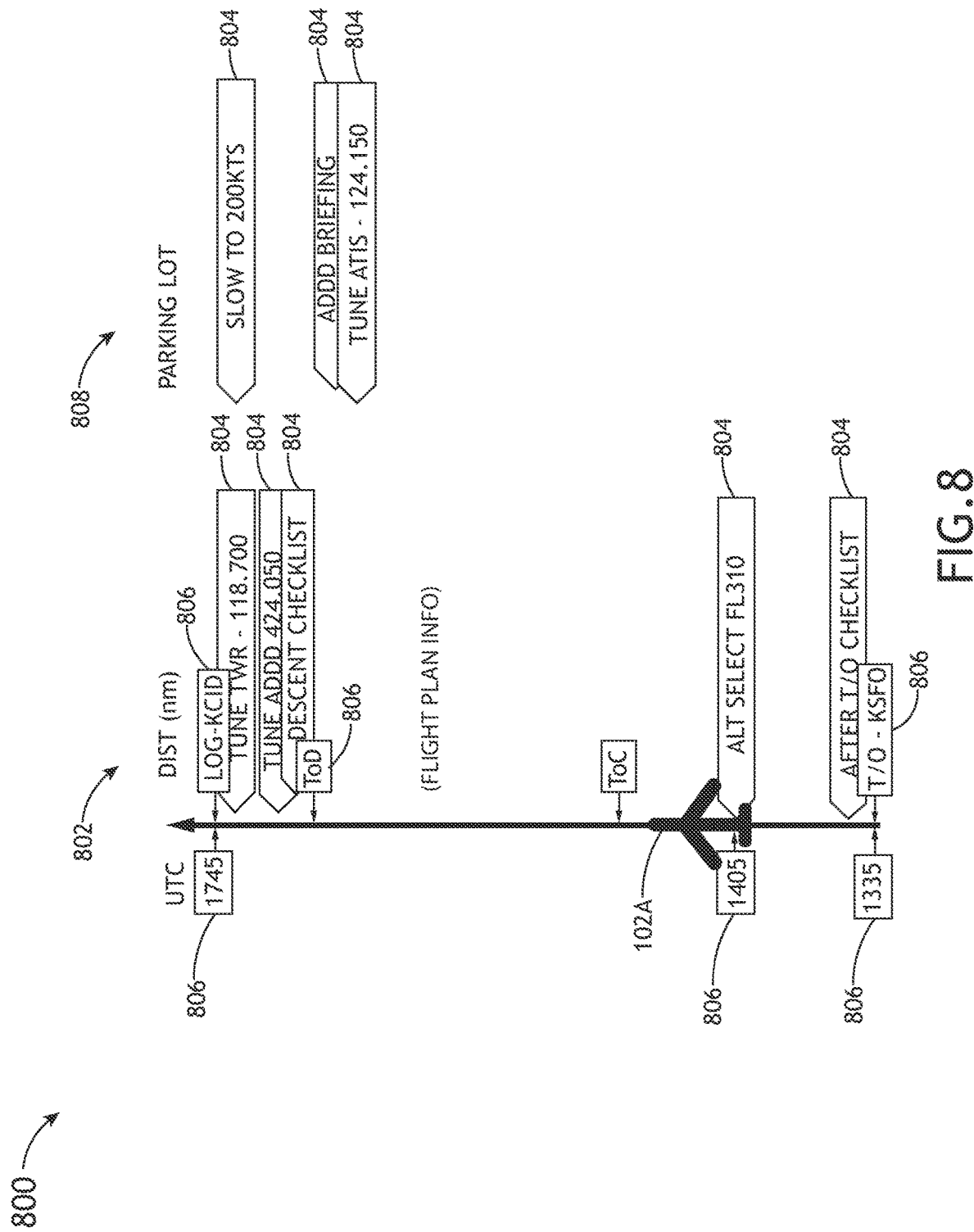
FIG. 8 is a view of an exemplary embodiment of a graphical depiction according to the inventive concepts disclosed herein.
Figure 9:
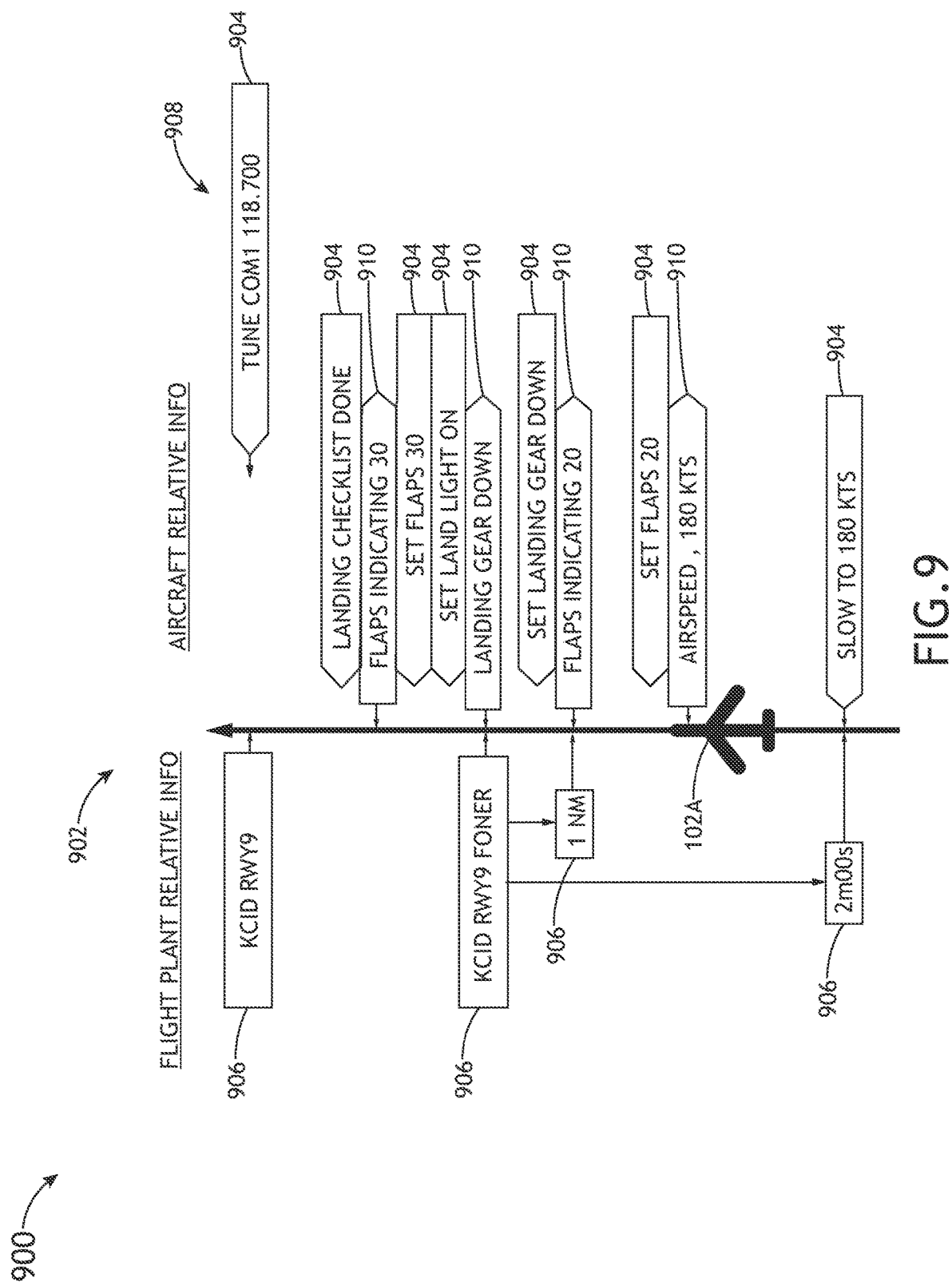
FIG. 9 is a view of an exemplary embodiment of a graphical depiction according to the inventive concepts disclosed herein.
Figure 10:
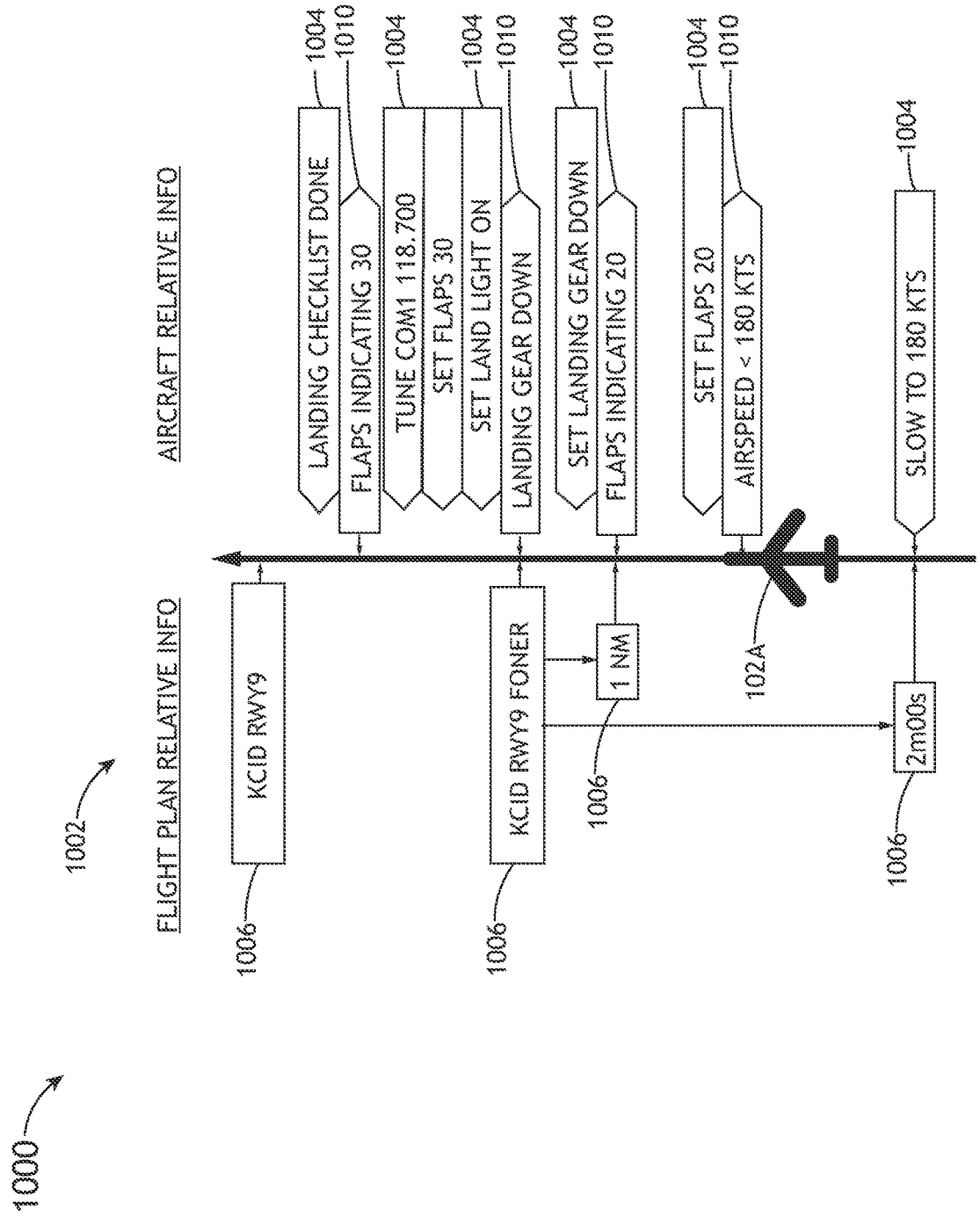
FIG. 10 is a view of an exemplary embodiment of a graphical depiction according to the inventive concepts disclosed herein.

In some embodiments, the processor 402 of the computing device 210A may be further configured to receive flight plan data associated with flight plan information, wherein the conditional timeline may be a flight plan relative conditional timeline (e.g., as shown in FIGS. 7 and 8), wherein each of at least some of the multiple actions may have at least one particular trigger event that is associated with a portion of the flight plan information. In some embodiments, the 402 may be further configured to receive aircraft data associated with aircraft information of the aircraft, wherein the flight plan relative conditional timeline comprises a flight plan relative and aircraft information relative conditional timeline (e.g., as shown in FIGS. 9-10), wherein each of at least some of the multiple actions may have at least one particular trigger event that is associated with a portion of the aircraft information and/or the flight plan information. In some embodiments, at least one of the multiple action items may be at least one electronic flight checklist item, wherein at least one of the multiple actions is associated with the at least one electronic flight checklist item.

The computing device 210B may be implemented as any suitable computing device, such as an autopilot computing device. As shown in FIG. 4, the computing device 210B may include the elements of the computing device 210 and may include at least one processor 402, at least one memory 404, and/or at least one storage 406, some or all of which may be communicatively coupled at any given time. For example, the at least one processor 402 may include at least one general purpose processor (e.g., at least one central processing unit (CPU)), at least one digital signal processor (DSP), at least one application specific integrated circuit (ASIC), and/or at least one field-programmable gate array (FPGA). The processor 402 may be configured to run various software applications (e.g., an autopilot application) or computer code stored (e.g., maintained) in a non-transitory computer-readable medium (e.g., memory 404 and/or storage 406) and configured to execute various instructions or operations. The processor 402 of the computing device 210B may be configured to perform any or all of the operations disclosed throughout. For example, the processor 402 of the computing device 210B may be configured to: receive sensor data from the sensors 208; receive and/or output data from and/or to at least one other computing device (e.g., 206, 210A, and/or 210C); receive and/or output data from and/or to the equipment 212; receive commands configured to cause the aircraft to follow a flight path and/or flight plan; and/or cause the aircraft to follow a flight path and/or flight plan.

The computing device 210C may be implemented as any suitable computing device, such as an air data computer. As shown in FIG. 4, the computing device 210C may include the elements of the computing device 210 and may include at least one processor 402, at least one memory 404, and/or at least one storage 406, some or all of which may be communicatively coupled at any given time. For example, the at least one processor 402 may include at least one general purpose processor (e.g., at least one central processing unit (CPU)), at least one digital signal processor (DSP), at least one application specific integrated circuit (ASIC), and/or at least one field-programmable gate array (FPGA). The processor 402 may be configured to run various software applications (e.g., an air data computer application) or computer code stored (e.g., maintained) in a non-transitory computer-readable medium (e.g., memory 404 and/or storage 406) and configured to execute various instructions or operations. The processor 402 of the computing device 210C may be configured to perform any or all of the operations disclosed throughout. For example, the processor 402 of the computing device 210C may be configured to: receive sensor data from the sensors 208; receive and/or output data from and/or to at least one other computing device (e.g., 206, 210A, and/or 210B); receive and/or output data from and/or to the equipment 212; store and output aircraft data associated with aircraft information.

Figure 5:
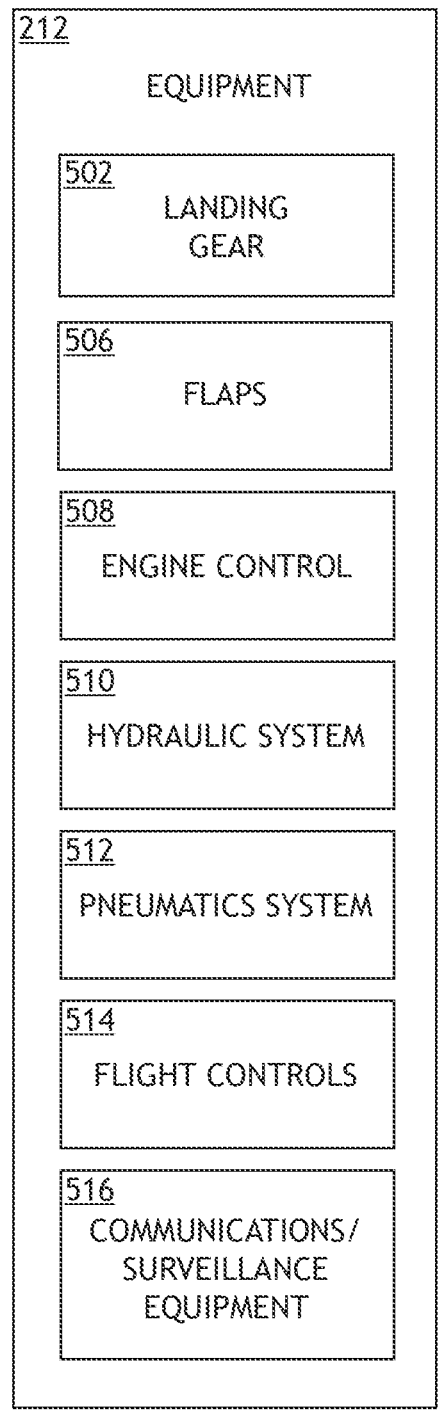
FIG. 5 is a view of an exemplary embodiment of equipment of FIG. 2 according to the inventive concepts disclosed herein.

The equipment 212 may be any suitable equipment, which may be commonly found in an aircraft. For example, as shown in FIG. 5, the equipment 212 may include landing gear 502, flaps 506, engine controls 508, hydraulic system(s) 510, pneumatic system(s) 512 (e.g., at least one pressurization system and/or at least one ECS), and/or communications and/or surveillance equipment 516.

For example, the communications and/or surveillance equipment 516 may be any suitable communications and/or surveillance equipment configured to transmit and/or receive communications (e.g., data and/or voice) (a) to and/or from at least one other aircraft (e.g., 102), (b) to and/or from at least one ATC (not shown), and/or (c) to and/or from another offboard site (e.g., a remote pilot ground station). For example, the communications and/or surveillance equipment 516 may include any or all of the following: at least one ADS-B transceiver (e.g., at least one ADS-B transmitter and/or at least one ADS-B receiver); at least one radio; at least one ADS-Contract (ADS-C) transceiver (e.g., at least one ADS-C transmitter and/or at least one ADS-C receiver); at least one controller-pilot data link communications (CPDLC) radio; and/or any other communications and/or surveillance equipment commonly installed in aircraft (e.g., 102).

Referring still to FIGS. 2-5, for example, at least one processor (e.g., the at least one processor 304, the at least one processor 402 of the computing device 210A, the at least one processor 402 of the computing device 210B, and/or the at least one processor 402 of the computing device 210C) may be configured to perform (e.g., collectively perform, if more than one processor) any or all of the operations disclosed throughout.

Referring now to FIG. 6, an exemplary embodiment of exemplary graphical depictions 600-1, 600-2, 600-3, 600-4, 600-5 of exemplary states of a conditional timeline 602-1, 602-2, 602-3, 602-4, 602-5 at five different times (t=1 through 5, which are not necessarily sequential) and multiple action items 604-1, 604-2, 604-3, 604-4 according to the inventive concepts disclosed herein is depicted. Each of the graphical depictions 600-1, 600-2, 600-3, 600-4, 600-5 for a given state may include a conditional timeline 602-1, 602-2, 602-3, 602-4, or 602-5 (e.g., a horizontal conditional timeline), and the multiple action items 604-1, 604-2, 604-3, 604-4 may be graphically arranged (e.g., arranged horizontally) along the conditional timeline 602-1, 602-2, 602-3, 602-4, or 602-5 according to a relative order of when the multiple actions associated with the multiple action items 604-1, 604-2, 604-3, 604-4 would at least one of begin or be completed. For example, each action item 604-1, 604-2, 604-3, or 604-4 may indicate a particular action of the multiple actions and a status of the particular action. For example, the status may be indicated by any or all of the following: a textual indication (e.g., "off", "starting", "running", "on", or "failed"), a color, a shading pattern, and/or a border pattern and/or color. For example, the graphical depictions 600-1, 600-2, 600-3, 600-4, 600-5 of the conditional timeline 602-1, 602-2, 602-3, 602-4, or 602-5 and the multiple action items 604-1, 604-2, 604-3, 604-4 may function as a graphical flight control panel. For example, the display 302 may be configured to present the graphical depictions 600-1, 600-2, 600-3, 600-4, 600-5 to the user 202.

As exemplarily shown in FIG. 6, the graphical depictions 600-1, 600-2, 600-3, 600-4, 600-5 of the conditional timeline 602-1, 602-2, 602-3, 602-4, or 602-5 and the multiple action items 604-1, 604-2, 604-3, 604-4 represent five different states during an Auxiliary Power Unit (APU) start sequence. Typically, only one of the five graphical depictions 600-1, 600-2, 600-3, 600-4, 600-5 would be visible at any given time, and one of the graphical depictions 600-1, 600-2, 600-3, 600-4, 600-5 would be presented on a cockpit control display (e.g., 302). Currently, to perform an existing APU start sequence, the user 202 would press an "APU Start" button, wait for the APU to start and then press the generator off ("GEN OFF") button to switch the generator on, then wait for the generator to come online, then press the "ECS" button to switch the Environmental Control System on, then wait for the ECS to come online, and finally, press the "Avionics Off" button to turn on the avionics.

In an exemplary embodiment, states t=1 through t=3 show a normal progression of APU start then Generator On. T=1 is an initial state with no switches set or armed. For example, an action item 604-1, 604-2, 604-3, 604-4 may have a particular colored (e.g, yellow) outline if an associated action is occurring. T=2 shows that while the APU is still starting, the user 202 has pre-armed (e.g., which may be shown as a thick white outline on action item 604-2) the generator to come online as soon as an APU RUNNING trigger event is met for an action of turning on the generator. T=3 illustrates APU RUNNING (as shown by 604-1), generator coming online (as shown by 604-2), and both ECS (as shown by 604-3) and AVIONICS (as shown by 604-4) pre-armed to come online. T=4 is a failure scenario state showing that neither the ECS (as shown by 604-3) nor the AVIONICS (as shown by 604-4) came online. T=5 shows all action items (as shown by 604-1, 604-2, 604-3, 604-4) online after a normal sequenced start has completed. For example, any "pre-armed" action can be reset back to standby by pressing the associated button for the action item (e.g., 604-1, 604-2, 604-3, or 604-4). In some embodiments, such as shown in t=4, if the user 202 requests an action (e.g., staring AVIONICS) that cannot be performed immediately, the trigger event(s) (e.g., "ECS OFF" indicating that the trigger event of ECS on is absent) that may be required for the action to take place can also be displayed in the graphical depiction 600-4; the AVIONICS OFF to ON transition action may remain pre-armed at t=4, but the action cannot occur because the ECS cooling to the avionics is still off.

Referring now to FIG. 7, an exemplary embodiment of an exemplary graphical depiction 700 of a conditional timeline 702 (e.g., a flight plan relative conditional timeline) and multiple action items 704-1, 704-2, 704-3 according to the inventive concepts disclosed herein is depicted. The multiple action items 704-1, 704-2, 704-3 may be graphically arranged (e.g., arranged horizontally at a height along the vertical conditional timeline 702) along the conditional timeline 702 according to a relative order of when the multiple actions associated with the multiple action items 704-1, 704-2, 704-3 would at least one of begin or be completed. For example, each action item 704-1, 704-2, 704-3 may indicate a particular action of the multiple actions and a status of the particular action. For example, the status may be indicated by any or all of the following: a textual indication (e.g., "off" or "on"), a color, a shading pattern, and/or a border pattern and/or color. For example, the display 302 may be configured to present the graphical depiction 700 to the user 202.

In some embodiments, with respect to the graphical depiction 700, user inputs may allow the user 202 to pre-arm each action to a point on the conditional timeline 702 (e.g., a flight plan relative conditional timeline), which may be maintained, for example, by the FMS computing device 210A of the aircraft 102A.

For example, coupling the action items 704-1, 704-2, 704-3 associated with pre-armed actions to the conditional timeline 702 (e.g., a flight plan relative conditional timeline) may effectively add another column to the flight plan for non-flight-plan pre-armed actions. Each action item 704-1, 704-2, or 704-3 associated with a pre-armed action may point to a flight plan trigger event occurring on the conditional timeline 702 (e.g., a flight plan relative conditional timeline), and in some embodiments, such a flight plan trigger event may include an absolute or relative time. If the time is absolute, for instance, for oceanic position reporting, then the flight plan trigger event may dynamically float along the conditional timeline 702 to show when that time occurs relative to other flight plan events. If the time is relative to a space referenced point on the timeline, then the flight plan trigger event may float but relative to speed and any changes to that point on the conditional timeline 702, such as when an arrival procedure is inserted into a flight plan and a previously loaded approach procedure gets pushed "down" the timeline.

As shown in FIG. 7, flight commands appropriate to the flight control systems are shown along the conditional timeline 702 (e.g., a flight plan relative conditional timeline), such as lateral and vertical mode commands (TRACK, LEVEL, CLIMB). To the right of the flight commands, are pre-armed action items 704-1, 704-2, 704-3 for system control commands (e.g., LIGHTS OFF). In this example, three light switch actions of the associated action items 704-1, 704-2, 704-3 are pre-armed to be turned off when a trigger event of 10,000 feet altitude is reached. In some embodiments, any suitable system command actions may be pre-armed to occur at any suitable trigger events and added as action items (e.g., similar to 704-1, 704-2, 704-3) along the conditional timeline 702.

In some embodiments, the conditional timeline 702 may or may not be to scale, and the scale may be uniform or vary across a segment(s) displayed. In some embodiments, an option would be to place a marker off a front of a location indicator for the aircraft 102A with time and/or distance based scale markings to allow the crew to anticipate when trigger events may happen.

In some embodiments, the three light switch actions of the associated action items 704-1, 704-2, 704-3 may be added along the conditional timeline 702 and pre-armed by the user 202 performing a sequence of user inputs. For example, the sequence may be for the user 202 to first touch a first action item (e.g., 704-1) button, and then while the first action item (e.g., 704-1) button is "selected", touch a point along the conditional timeline 702, wherein the point represents a trigger event for triggering the action to occur. In some embodiments, a distinction between touch and pre-arm could be represented in multiple ways, such as double touch to pre-arm, or light touch to select and heavy press to pre-arm. In some embodiments, when adding an action item(s) (e.g., 704-1, 704-2, 704-3) to the conditional timeline 702 (e.g., a flight plan relative conditional timeline), the action item(s) (e.g., 704-1, 704-2, 704-3) may be copied into place and may even be selectable to disarm the actions from pre-armed status.

In some embodiments, pre-arming a sequence of action items 704-1, 704-2, 704-3 may be performed by linking the sequence of action items 704-1, 704-2, 704-3 in order. For example, a first action item (e.g., 704-1) may be selected to be pre-armed, and then while the first action item (e.g., 704-1) is in selected state, a second action item (e.g., 704-2) may be selected to follow and link to the first action item (e.g., 704-1). The first action item (e.g., 704-2), which is linked to the second action item (e.g., 704-2), may be a trigger event for the second action item (e.g., 704-2) when the first action associated with the first action item (e.g., 704-1) is complete (e.g., in a TRUE state). As shown in FIG. 7, involving the light switch actions, the first action item (e.g., 704-1) may have a trigger event of when the altitude hits 10000 ft and the aircraft enters LEVEL flight. As soon as LEVEL flight mode is selected, the LOGO LIGHT associated with the the first action item (e.g., 704-1) is turned OFF. As soon as the LOGO LIGHT is turned OFF, then the ICE DETECT light is turned OFF associated with the second action item (e.g., 704-2). As soon as the ICE DETECT light is turned OFF, the INBD LANDING light is turned OFF associated with the third action item (e.g., 704-3). Alternatively, in some embodiments, the sequence of action items 704-1, 704-2, 704-3 and associated actions may all share at least one common trigger event, and in response to the trigger event(s) occurring, the actions associated with the action items 704-1, 704-2, 704-3 may be performed at least substantially simultaneously (e.g., simultaneously).

In some embodiments, other exemplary possible actions (e.g., other system command actions) along a flight plan relative conditional timeline may include: an action of "Weather radar (WXR) to Standby" (which typically would occur after touchdown) could be set to occur when a trigger event of being on the "Taxi" phase on the flight plan relative conditional timeline; and/or an action of "Contact Tower" (which may be intended to occur at an outer marker) could be set to occur when a trigger event of being at a waypoint representing the outer marker occurs (e.g., this example may be accomplished by touching a preset Tower frequency action item and then touching an outer marker on the flight plan timeline to pre-arm the action and add the action item to the flight plan relative conditional timeline.) In some embodiments, if a pre-armed action item is coupled to a point along a flight plan relative conditional timeline and the point is subsequently deleted from the flight plan relative conditional timeline, some implementations may warn the user 202 that pre-armed actions will be deleted, and other implementations may simply disarm the action and delete the action. In some embodiments, canceling pre-armed actions could be as simple as touching associated action items on the flight plan relative conditional timeline and then selecting a popup option to delete the action, or the act of touching the action item, itself, may delete the action.

Referring now to FIG. 8, an exemplary embodiment of an exemplary graphical depiction 800 of a conditional timeline 802 (e.g., a flight plan relative conditional timeline), multiple action items 804, flight plan information 806, a collection (e.g., a parking lot 808) of possible action items 804, and a location indicator of the aircraft 102A according to the inventive concepts disclosed herein is depicted. In some embodiments, except for action items 804 in the parking lot 808, the multiple action items 804 may be graphically arranged (e.g., arranged at a height along the vertical conditional timeline 802) along the conditional timeline 802 according to a relative order of when the multiple actions associated with the multiple action items 804 would at least one of begin or be completed. For example, each action item 804 may indicate a particular action of the multiple actions and a status of the particular action. For example, the status may be indicated by any or all of the following: a textual indication, a color, a shading pattern, and/or a border pattern and/or color. For example, the display 302 may be configured to present the graphical depiction 800 to the user 202.

In some embodiments, the conditional timeline 802 may or may not be to scale, and the scale may be uniform or vary across a segment(s) displayed. In some embodiments, an option would be to place a marker off a front of a location indicator for the aircraft 102A with time and/or distance based scale markings to allow the crew to anticipate when trigger events may happen.

For example, the conditional timeline 802 (e.g., a flight plan relative conditional timeline) may include flight plan information 806 arranged along the conditional timeline 802. For example, the flight plan information 806 may include information associated with a time at, to, or from events (e.g., universal time (UTC)) along the conditional timeline 802, location of events along the conditional timeline 802, and/or a distance at, to, or from events along the conditional timeline 802. Some of the flight plan information may be used for trigger events for actions and associated action items 804.

In some embodiments, the graphical depiction 800 may include a collection (e.g., a parking lot 808) of possible action items 804. For example, the user 202 may identify actions that should be or could be completed during a flight, but the user 202 might not know exactly when the actions should or will take place or might not choose to currently pre-arm the action. These identified actions and associated possible action items 804 (e.g., with unknown timing and/or position trigger events) can be placed in the parking lot 808 as reminders that are displayed to a side of the conditional timeline 802. For example, the parking lot 808 may be particularly helpful when there is a need to defer a checklist action, or when a helpful thought comes to mind relative to future needs of the flight. Sequences of possible action items 804 may be placed in the parking lot 808, where some of the possible actions have a trigger event of completing a preceding possible action item 804 in the sequence. Such sequences of possible action items 804 may allow the user 202 to pre-cluster possible actions and associated possible action items 804, and later the user 202 can assign the cluster of possible action items 804 to a given point (e.g., serving as trigger event for the first action item 804 in the sequence) on the conditional timeline 802, or the user 202 can subsequently manually trigger immediate execution of the sequence of the possible action items 804 by manually triggering only a first action item 804 of the sequence.

In some embodiments, a first action item 804 of a sequence of action items 804 may obey "affirmative action" principles, which may require the user 202 to acknowledge the first pre-armed action, such as via pressing an <enter> button, or by the user manually triggering the first action. Second and subsequent action items 804 of a sequence, which have a trigger event conditional on earlier action items 804 in the sequence occurring, may be completed automatically if the trigger events are completed, and assuming there are no other overriding system conditions. If a trigger event for a second or subsequent action item 804 of a sequence is not met, the action sequence may stop, and the unmet trigger event may be annunciated adjacent to an action item 804 that is unable to be performed. If a time and/or position for an action arrives and the user 202 does not make an "affirmative action" to initiate the first action item 804 (and the sequence's subsequent action items 804), then the first action item 804 may be highlighted indicating the first action item 804 is "Past Due" for a reason not performed.

In some embodiments, the user 202 can place reminders for any point along the conditional timeline 802 (e.g., a flight plan relative conditional timeline) or the reminders may be assigned to a beginning of a next flight. In some embodiments, a reminder may take the form of free-form entered text, recorded audio, or a pointer to a pre-defined action item 804, such as a checklist action item 804, autopilot mode action item 804, radio frequency tune action item 804, and/or shortcut action item 804. Reminders can also be created by creating temporary shortcuts to do things like bring up the Taxi Diagram of a given airport. For example, when the desired Taxi Diagram is visible, the user 202 may click on a symbol (or use a dedicated button, etc.) to "Create Shortcut" and then place the shortcut on the conditional timeline 802 (e.g., a flight plan relative conditional timeline). For example, such shortcuts, can be a convenient way to reconfigure cockpit displays while on the ground, with settings, such as selected range or location of window, stored with the created shortcut to the display format.

In some embodiments, the user 202 may perform user inputs causing pre-armed action items 804 positioned along the conditional timeline 802 to be removed and associated actions disarmed. In some embodiments, the user 202 may perform user inputs causing a pre-armed action item 804 or a sequence of pre-armed action items 804 positioned along the conditional timeline 802 to be removed and transferred to the parking lot 808.

As shown in FIG. 8, action items 804 and associated actions that have already been completed may be colored a distinct color (e.g., green). The parking lot 808 action items 804 may be shown including one with a dependency trigger event (which may be indicated by an indented arrowhead from the "TUNE ATIS" action item 804 that serves as the trigger event). The Descent Checklist action item 804 is shown with a trigger event of reaching the Top of Descent (ToD) flight plan information 806 point (and such action item 804 may move along with such flight plan information 806 moving). The current aircraft position 102A is shown between the ALT SELECT FL310 action item 804 and the Top of Climb (ToC) flight plan information 806 point, and a predicted landing time of 1745 flight information 806 is shown.

Referring now to FIG. 9, an exemplary embodiment of an exemplary graphical depiction 900 of a conditional timeline 902 (e.g., a flight plan relative and aircraft information relative conditional timeline), multiple action items 904, flight plan information 906, aircraft information 910, a collection (e.g., a parking lot 908) of possible action items 904, and a location indicator of the aircraft 102A according to the inventive concepts disclosed herein is depicted. In some embodiments, the multiple action items 904 may be graphically arranged (e.g., arranged at a height along the vertical conditional timeline 902) along the conditional timeline 902 according to a relative order of when the multiple actions associated with the multiple action items 904 would at least one of begin or be completed. For example, each action item 904 may indicate a particular action of the multiple actions and a status of the particular action. For example, the status may be indicated by any or all of the following: a textual indication, a color, a shading pattern, and/or a border pattern and/or color. For example, the display 302 may be configured to present the graphical depiction 900 to the user 202.

In some embodiments, the conditional timeline 902 may or may not be to scale, and the scale may be uniform or vary across a segment(s) displayed. In some embodiments, an option would be to place a marker off a front of a location indicator for the aircraft 102A with time and/or distance based scale markings to allow the crew to anticipate when trigger events may happen.

For example, the conditional timeline 902 (e.g., a flight plan relative and aircraft information relative conditional timeline) may include flight plan information 906 arranged along the conditional timeline 902. For example, the flight plan information 906 may include information associated with a time at, to, or from events (e.g., universal time (UTC)) along the conditional timeline 902, location of events along the conditional timeline 902, and/or a distance at, to, or from events along the conditional timeline 902. Some of the flight plan information 906 may be used for trigger events for actions and associated action items 904.

For example, the conditional timeline 902 (e.g., a flight plan relative and aircraft information relative conditional timeline) may include aircraft information 910 arranged along the conditional timeline 902. For example, the aircraft information 910 may include any information associated with a state of the aircraft 102A and/or a state of equipment of the aircraft 102A, such as speed at a point along the conditional timeline 902, altitude, a state of landing gear, or a state of flaps. Some of the aircraft information 910 may be used for trigger events for actions and associated action items 904.

As shown in FIG. 9, for example, the graphical depiction 900 shows aircraft information 910 as "Flaps indicating 20", "Airspeed<180 kts", and "Landing Gear Indicating Down", and such aircraft information 910 to may be used as trigger event(s) for action(s) and any associated action item 904 or any associated sequence of action items 904. For example, the graphical depiction 900 may include a sequence of action items 904 for approaching a Final Approach Fix (FAF). As shown in FIG. 9, flight plan information 909 (e.g., flight plan relative information), which may be shown relative to time and/or distance, may be on the left side of a vertical progress arrow of the conditional timeline 902 (e.g., a flight plan relative and aircraft information relative conditional timeline). As shown in FIG. 9, aircraft relative information may be on the right side of the vertical progress arrow of the conditional timeline 902. For example, the aircraft relative information may include monitoring of aircraft information 910 (e.g., aircraft states and/or aircraft equipment states) and action items 904. In some embodiments, some of the aircraft information 910 may also include touchscreen controls (sometimes referred to as "soft controls"), such as for controlling Landing Gear 502 and/or Flaps 506, where such touchscreen controls may be accessed by the user 202 pressing such associated aircraft information 910.

In some embodiments, an action item 904 and associated action may have a flight plan information trigger event (e.g., on the left side of the vertical progress arrow of the conditional timeline 902) and an aircraft relative information trigger event (on the right side of the vertical progress arrow of the conditional timeline 902), such that both the flight plan information trigger event and the aircraft relative information trigger event must be met for a pre-armed action to execute.

As shown in FIG. 9, when the aircraft 102A reached a flight plan information 906 point (e.g., serving as a trigger event) two minutes prior to a specified location (e.g., a location of "KCID RWY9 FONER"), an action (e.g., associated with action item 904) was executed to issue a command to SLOW TO 180 KTS (180 knots). When the aircraft information 910 indicated "airspeed indicated<180 KTS" (e.g., serving as a trigger event), an action (e.g., associated with action item 904) was executed to issue a command to SET FLAPS 20 (e.g., colored (e.g., green) hashed lines may indicate command is being processed). When both (a) the aircraft information 910 of FLAPS INDICATING 20 (e.g., serving as a first trigger event) is true and (b) the flight plan information 906 of the aircraft 102A is 1 nautical mile (NM) from a specified location (e.g., a waypoint of "FONER") (e.g., serving as a second trigger event), then an action (e.g., associated with action item 904) was executed to issue a command to SET LANDING GEAR DOWN. When both (a) the aircraft information 910 of LANDING GEAR DOWN (e.g., serving as a first trigger event) and (b) the flight plan information 906 of the aircraft 102A reached FONER (e.g., serving as a second trigger event), then actions (e.g., associated with action items 904) were executed to turn LANDING LIGHT ON, SET FLAPS 30, and TUNE COM1 118.700 commands. And, finally, when the aircraft information 910 of the FLAPS INDICATING 30 is true (e.g., serving as a trigger event), an action (e.g., associated with action item 904) was executed to issue a command to execute LANDING CHECKLIST DONE.

For example, the collection (e.g., the parking lot 908) of possible action items 904 may be implemented similarly and function similar as shown in and described with respect to FIG. 8.

As shown in FIG. 9 (as compared to FIG. 10), the action item 904 for TUNE COM1 118.700 may be in the parking lot 908, and will not be automatically executed. For example, the user 202 may immediately execute, such as via a "double click", any action item 904 in the parking lot 904. Additionally, the user 202 may pre-arm the action item 904 of the parking lot 908 by dragging and dropping a left arrow tip of the action item 904 to either a reference point defined on the conditional timeline 902 or to another action item 904 already coupled to the conditional timeline 902 (e.g., the TUNE COM1 118.700 action item 904 could be attached to the SET FLAPS 30 action item 904, similar to as shown in FIG. 10.) Additionally, a flight plan reference point(s) can be added, such as by clicking on an anchor point of the conditional timeline 902 and specifying either a time or distance relative to the reference point.

Referring now to FIG. 10, an exemplary embodiment of an exemplary graphical depiction 1000 of a conditional timeline 1002 (e.g., a flight plan relative and aircraft information relative conditional timeline), multiple action items 1004, flight plan information 1006, aircraft information 1010, and a location indicator of the aircraft 102A according to the inventive concepts disclosed herein is depicted. In some embodiments, the multiple action items 1004 may be graphically arranged (e.g., arranged at a height along the vertical conditional timeline 1002) along the conditional timeline 1002 according to a relative order of when the multiple actions associated with the multiple action items 1004 would at least one of begin or be completed. For example, each action item 1004 may indicate a particular action of the multiple actions and a status of the particular action. For example, the status may be indicated by any or all of the following: a textual indication, a color, a shading pattern, and/or a border pattern and/or color. For example, the display 302 may be configured to present the graphical depiction 1000 to the user 202.

In some embodiments, the conditional timeline 1002 may or may not be to scale, and the scale may be uniform or vary across a segment(s) displayed. In some embodiments, an option would be to place a marker off a front of a location indicator for the aircraft 102A with time and/or distance based scale markings to allow the crew to anticipate when trigger events may happen.

For example, the conditional timeline 1002 (e.g., a flight plan relative and aircraft information relative conditional timeline), the multiple action items 1004, the flight plan information 1006, and the aircraft information 1010 may be implemented similarly and function similar as shown in and described with respect to FIG. 9.

As shown in FIG. 10 (as compared to FIG. 9), the action item 1004 for TUNE COM1 118.700 may be attached to the SET FLAPS 30 action item 1004.

In some embodiment, there may be multiple ways in which the user 202 can create a sequence of action items 1004, where a first action item 1004 serves as a trigger event for any subsequent action items 1004. For example, the user 202 may select a subsequent action item 1004 and "drop" or "paste" the subsequent action item 1004 onto an immediately preceding action item 1004; this could be performed via a drag and drop user input, or via independent selection of the subsequent action item 1004 followed by a selection of the immediately preceding action item (or a distinct portion on the immediately preceding action item, which could, for example, be indicated by a "+" symbol). Also, if a subsequent action item 1004 is selected that already has its own subsequent action item(s) 1004, the whole sequence of subsequent action items 1004 may be selected while maintaining a proper current order, and the whole sequence can then be attached to a new preceding action item 1004.

In some embodiments, the user 202 may pick from a list(s) of trigger events, such as a list of flight plan information 1006 trigger events and a list of aircraft information 1010 trigger events (e.g., for specified aircraft and equipment states). Some of these trigger events may be persistent regardless of flight plan content. For example, the user 202 may pick a trigger event referenced to a distance from a destination airport and/or runway, and/or a trigger event referenced to passing through a specified altitude. Trigger events may also be specified relative to items (e.g., known and/or consistent items) in a flight plan such as Top of Climb (ToC) or Top of Descent (ToD). In some embodiments a computing device (e.g., 210A) may suggest to the user 202 actions predicated upon these types of trigger events as they may not be subject to change when a flight plan changes.

In some embodiments, a computing device (e.g., 210A) may also offer the user 202 the ability to template actions and sequences of actions. In the above example with respect to FIGS. 9-10, FONER is known as a Final Approach Fix (FAF). If the winds were to change, and the airport started using RWY 31 instead of RWY 9, a flight plan may change to an area navigation (RNAV) approach to RWY 31 with a different waypoint (SHEWY) as the FAF. The computing device (e.g., 210A) may prompt the user 202 to "transfer" the trigger events and action items 904 to reference SHEWY instead of FONER to reduce the need for the user to re-enter/re-arm the actions and action items 904. This "templating" may be possible whenever there are common elements of a flight plan to reference such as ToC, ToD, initial approach fix (IAF), FAF, and/or Destination Airport and/or Runway.

Referring now to FIG. 11, an exemplary embodiment of an exemplary graphical depiction 1100 of a conditional timeline 1102 (e.g., a conditional timeline that functions as an interactive electronic flight checklist), and multiple action items 1104 according to the inventive concepts disclosed herein is depicted. In some embodiments, the multiple action items 1104 may be graphically arranged (e.g., arranged at a height along the vertical conditional timeline 1102) along the conditional timeline 1102 according to a relative order of when the multiple actions associated with the multiple action items 1104 would at least one of begin or be completed. For example, each action item 1104 may indicate a particular action of the multiple actions and a status of the particular action. For example, the status may be indicated by any or all of the following: a textual indication, a color, a shading pattern, a checked box, an arrowed box, an empty box, and/or a border pattern and/or color. For example, the multiple action items 1104 may be electronic flight checklist action items associated with electronic flight checklist actions. For example, the display 302 may be configured to present the graphical depiction 1100 to the user 202.

In some embodiments, just as trigger events may be chosen from a list, actions to be taken may also be chosen from a list. For example, as shown in FIG. 11, for an aircraft 102A equipped with electronic checklists, this user 202 may select an action item 1104 from the checklist and attaching it as a pre-armed action to the conditional timeline 1102. The timeline may also be structured to allow the user to flag subsequent action items 1104 for execution upon sensed completion of prior action items 1104. In this case, while running the electronic checklist, the user 202 check off the action items 1104 to pre-arm, possibly in advance, and then when the predecessor action item 1104 serving as a trigger event has been accomplished, the action items that were pre-armed are executed. If the user 202 selects an action item 1104, whose predecessor is not satisfied, it will first go to ARMED status. If you select the action item 1104 again, regardless of predecessor state, the action item 1104 will attempt to execute.

Figure 12:
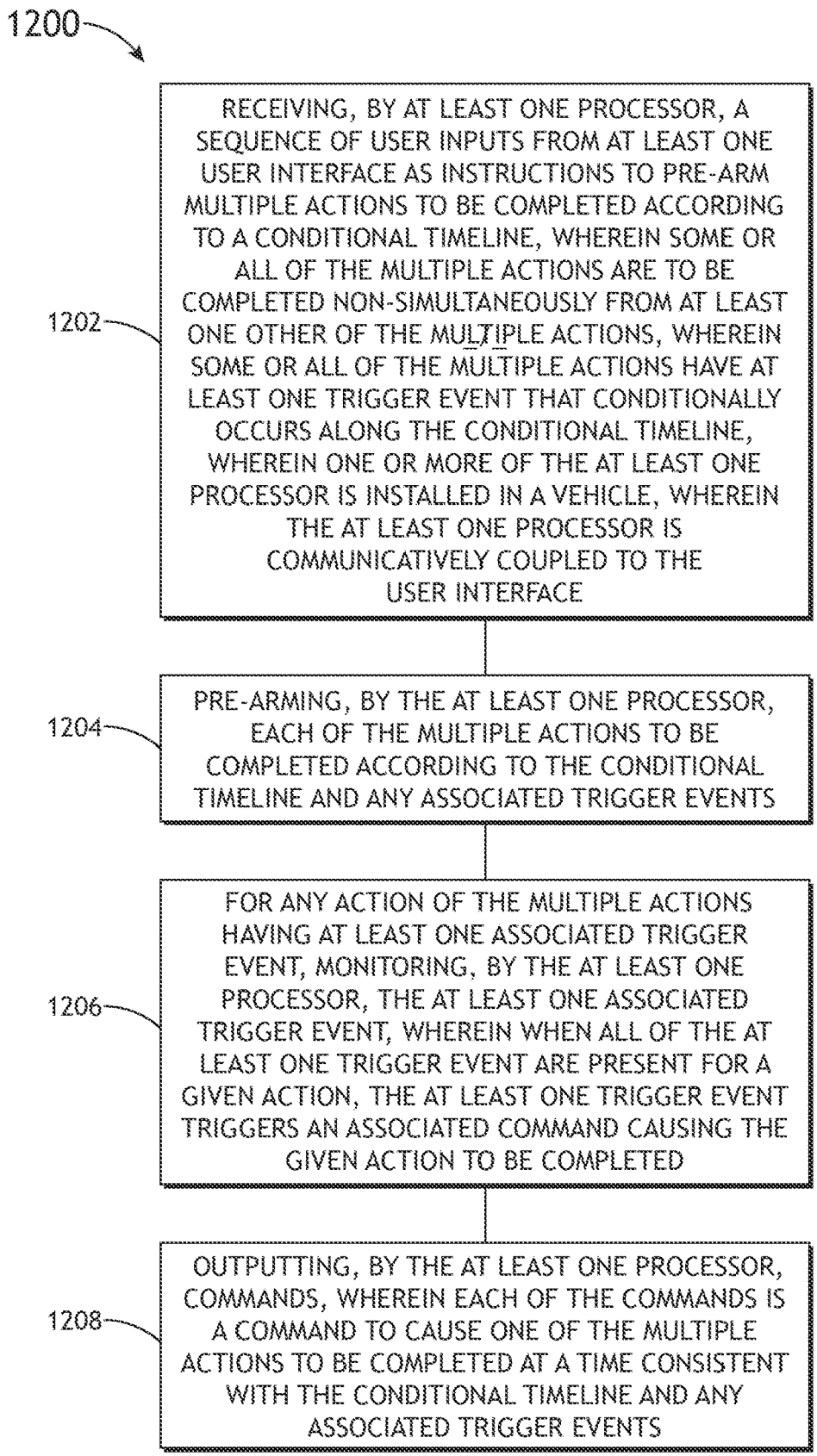
FIG. 12 is a diagram of an exemplary embodiment of a method according to the inventive concepts disclosed herein.

Referring now to FIG. 12, an exemplary embodiment of a method 1200 according to the inventive concepts disclosed herein may include one or more of the following steps. Additionally, for example, some embodiments may include performing one or more instances of the method 1200 iteratively, concurrently, and/or sequentially. Additionally, for example, at least some of the steps of the method 1200 may be performed in parallel and/or concurrently. Additionally, in some embodiments, at least some of the steps of the method 1200 may be performed non-sequentially.

A step 1202 may include receiving, by at least one processor, a sequence of user inputs from at least one user interface as instructions to pre-arm multiple actions to be completed according to a conditional timeline, wherein some or all of the multiple actions are to be completed non-simultaneously from at least one other of the multiple actions, wherein some or all of the multiple actions have at least one trigger event that conditionally occurs along the conditional timeline, wherein one or more of the at least one processor is installed in a vehicle, wherein the at least one processor is communicatively coupled to the user interface.

A step 1204 may include pre-arming, by the at least one processor, each of the multiple actions to be completed according to the conditional timeline and any associated trigger events.

A step 1206 may include, for any action of the multiple actions having at least one associated trigger event, monitoring, by the at least one processor, the at least one associated trigger event, wherein when all of the at least one trigger event are present for a given action, the at least one trigger event triggers an associated command causing the given action to be completed.

A step 1208 may include outputting, by the at least one processor, commands, wherein each of the commands is a command to cause one of the multiple actions to be completed at a time consistent with the conditional timeline and any associated trigger events.

Further, the method 1200 may include any of the operations disclosed throughout.

As will be appreciated from the above, embodiments of the inventive concepts disclosed herein may be directed to method and a system including a user interface and at least one processor configured to (a) pre-arm multiple actions according to a conditional timeline and any associated trigger events, and (b) output commands to cause the multiple actions to be completed at times consistent with the conditional timeline and any associated trigger events.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
   at least one user interface configured to receive user inputs of at least one user; and
   at least one processor, one or more of the at least one processor installed in a vehicle, the at least one processor communicatively coupled to the at least one user interface, the at least one processor configured to:
   receive a sequence of user inputs from the at least one user interface as instructions to pre-arm multiple actions to be completed according to a conditional timeline, wherein some or all of the multiple actions are to be completed non-simultaneously from at least one other of the multiple actions, wherein some or all of the multiple actions have at least one trigger event that conditionally occurs along the conditional timeline;
   pre-arm each of the multiple actions to be completed according to the conditional timeline and any associated trigger events;
   for any action of the multiple actions having at least one associated trigger event, monitor the at least one associated trigger event, wherein when all of the at least one trigger event are present for a given action, the at least one trigger event triggers an associated command causing the given action to be completed;
   output commands, wherein each of the commands is a command to cause one of the multiple actions to be completed at a time consistent with the conditional timeline and any associated trigger events; and
   output image data associated with a graphical depiction including the conditional timeline and multiple action items for presentation to the at least one user, each action item indicating a particular action of the multiple actions and a status of the particular action;
   receive at least one additional user input as an instruction to add at least one additional action to the multiple actions;
   wherein the at least one additional action is conditional on beginning or completing at least one other of the multiple actions, wherein the vehicle is an aircraft, wherein the multiple action items are graphically arranged along the conditional timeline according to a relative order of when the multiple actions associated with the multiple action items would at least one of begin or be completed.

2. The system of claim 1, wherein each status comprises an indication that the particular action is at least one of complete, awaiting completion of all associated trigger events, incomplete, failed, armed, deferred, or on standby.

3. The system of claim 1, wherein the graphical depiction further includes a collection of possible additional action items, wherein the at least one additional action is associated with at least one of the collection of possible action items, wherein the at least one of the collection of possible action items is selected from the collection by one or more of the at least one user.

4. The system of claim 1, wherein the at least one additional action is multiple additional actions, wherein the multiple additional actions are associated with a template of multiple additional action items, wherein the template is selected by one or more of the at least one user.

5. The system of claim 1, wherein the graphical depiction of the conditional timeline and the multiple action items functions as a graphical flight control panel.

6. The system of claim 1, wherein the graphical depiction of the conditional timeline and the multiple action items functions as an interactive electronic flight checklist, wherein each of the multiple action items is an electronic flight checklist item, wherein each of the multiple actions is associated with one of the electronic flight checklist items.

7. The system of claim 1, wherein the at least one processor is further configured to receive flight plan data associated with flight plan information, wherein the conditional timeline comprises a flight plan relative conditional timeline, wherein each of at least some of the multiple actions have at least one particular trigger event that is associated with a portion of the flight plan information.

8. The system of claim 7, wherein the at least one processor comprises at least one flight managements system (FMS) processor.

9. The system of claim 7, wherein the at least one processor is further configured to receive aircraft data associated with aircraft information of the aircraft, wherein the flight plan relative conditional timeline comprises a flight plan relative and aircraft information relative conditional timeline, wherein each of at least some of the multiple actions have at least one particular trigger event that is associated with a portion of the aircraft information.

10. The system of claim 9, wherein at least one of the multiple action items is at least one electronic flight checklist item, wherein at least one of the multiple actions is associated with the at least one electronic flight checklist item.

11. A method, comprising:
receiving, by at least one processor, a sequence of user inputs from at least one user interface as instructions to pre-arm multiple actions to be completed according to a conditional timeline, wherein some or all of the multiple actions are to be completed non-simultaneously from at least one other of the multiple actions, wherein some or all of the multiple actions have at least one trigger event that conditionally occurs along the conditional timeline, wherein one or more of the at least one processor is installed in a vehicle, wherein the at least one processor is communicatively coupled to the user interface;
pre-arming, by the at least one processor, each of the multiple actions to be completed according to the conditional timeline and any associated trigger events;
for any action of the multiple actions having at least one associated trigger event, monitoring, by the at least one processor, the at least one associated trigger event, wherein when all of the at least one trigger event are present for a given action, the at least one trigger event triggers an associated command causing the given action to be completed;
outputting, by the at least one processor, commands, wherein each of the commands is a command to cause one of the multiple actions to be completed at a time consistent with the conditional timeline and any associated trigger events; and
outputting, by the at least one processor, image data associated with a graphical depiction including the conditional timeline and multiple action items for presentation to the at least one user, each action item indicating a particular action of the multiple actions and a status of the particular action;
receiving, by the at least one processor, at least one additional user input as an instruction to add at least one additional action to the multiple actions;
wherein the at least one additional action is conditional on beginning or completing at least one other of the multiple actions, wherein the vehicle is an aircraft, wherein the multiple action items are graphically arranged along the conditional timeline according to a relative order of when the multiple actions associated with the multiple action items would at least one of begin or be completed.

12. A system, comprising:
at least one user interface configured to receive user inputs of at least one user; and
at least one processor, one or more of the at least one processor installed in a vehicle, the at least one processor communicatively coupled to the at least one user interface, the at least one processor configured to:
receive a sequence of user inputs from the at least one user interface as instructions to pre-arm multiple actions to be completed according to a conditional timeline, wherein some or all of the multiple actions are to be completed non-simultaneously from at least one other of the multiple actions, wherein some or all of the multiple actions have at least one trigger event that conditionally occurs along the conditional timeline;
pre-arm each of the multiple actions to be completed according to the conditional timeline and any associated trigger events;
for any action of the multiple actions having at least one associated trigger event, monitor the at least one associated trigger event, wherein when all of the at least one trigger event are present for a given action, the at least one trigger event triggers an associated command causing the given action to be completed;
output commands, wherein each of the commands is a command to cause one of the multiple actions to be completed at a time consistent with the conditional timeline and any associated trigger events; and
output image data associated with a graphical depiction including the conditional timeline and multiple action items for presentation to the at least one user, each action item indicating a particular action of the multiple actions and a status of the particular action;
receive at least one additional user input as an instruction to add at least one additional action to the multiple actions;

wherein the at least one additional action is multiple additional actions, wherein the multiple additional actions are associated with a template of multiple additional action items, wherein the template is selected by one or more of the at least one user, wherein the vehicle is an aircraft, wherein the multiple action items are graphically arranged along the conditional timeline according to a relative order of when the multiple actions associated with the multiple action items would at least one of begin or be completed.

13. The system of claim 12, wherein each status comprises an indication that the particular action is at least one of complete, awaiting completion of all associated trigger events, incomplete, failed, armed, deferred, or on standby.

14. The system of claim 12, wherein the graphical depiction further includes a collection of possible additional action items, wherein the at least one additional action is associated with at least one of the collection of possible action items, wherein the at least one of the collection of possible action items is selected from the collection by one or more of the at least one user.

15. The system of claim 12, wherein the graphical depiction of the conditional timeline and the multiple action items functions as a graphical flight control panel.

16. The system of claim 12, wherein the graphical depiction of the conditional timeline and the multiple action items functions as an interactive electronic flight checklist, wherein each of the multiple action items is an electronic flight checklist item, wherein each of the multiple actions is associated with one of the electronic flight checklist items.

17. The system of claim 12, wherein the at least one processor is further configured to receive flight plan data associated with flight plan information, wherein the conditional timeline comprises a flight plan relative conditional timeline, wherein each of at least some of the multiple actions have at least one particular trigger event that is associated with a portion of the flight plan information.

18. The system of claim 17, wherein the at least one processor comprises at least one flight managements system (FMS) processor.

19. The system of claim 18, wherein the at least one processor is further configured to receive aircraft data associated with aircraft information of the aircraft, wherein the flight plan relative conditional timeline comprises a flight plan relative and aircraft information relative conditional timeline, wherein each of at least some of the multiple actions have at least one particular trigger event that is associated with a portion of the aircraft information.

20. The system of claim 19, wherein at least one of the multiple action items is at least one electronic flight checklist item, wherein at least one of the multiple actions is associated with the at least one electronic flight checklist item.

* * * * *